United States Patent
Kessell (10) Patent No.: US 9,820,608 B2
(45) Date of Patent: Nov. 21, 2017

(54) APPARATUS AND METHOD FOR FLIPPING FOOD

(71) Applicant: Gwendolyn Kessell, Hopatcong, NJ (US)

(72) Inventor: Gwendolyn Kessell, Hopatcong, NJ (US)

(*) Notice: Subject to any disclaimer, the term of this patent is extended or adjusted under 35 U.S.C. 154(b) by 1021 days.

(21) Appl. No.: 13/917,613

(22) Filed: Jun. 13, 2013

(65) Prior Publication Data
US 2014/0157997 A1 Jun. 12, 2014

Related U.S. Application Data

(60) Provisional application No. 61/699,988, filed on Sep. 12, 2012.

(51) Int. Cl.
*A47J 37/00* (2006.01)
*A47J 37/04* (2006.01)
*A47J 37/06* (2006.01)

(52) U.S. Cl.
CPC ......... *A47J 37/041* (2013.01); *A47J 37/0694* (2013.01)

(58) Field of Classification Search
CPC .... A47J 37/041; A47J 37/0611; A47J 37/106; A47J 37/0694; A47J 37/08; A47J 37/049; A47J 37/0786; A23L 3/10
USPC ......... 99/343, 345, 347, 369, 372, 374–380, 99/394–402, 419, 421 R, 421 A, 421 H, 99/421 HH, 421 HV, 421 P, 421 TP
See application file for complete search history.

(56) References Cited

U.S. PATENT DOCUMENTS

| | | | | |
|---|---|---|---|---|
| 3,089,407 A * | 5/1963 | Kinkle | ................. | A47J 37/041 99/331 |
| 4,332,188 A * | 6/1982 | Rhear | ................. | A47J 37/0623 99/323.5 |
| 4,442,762 A * | 4/1984 | Beller | ................. | A47J 37/0704 99/340 |
| 4,583,452 A * | 4/1986 | Grosse | ................. | A47J 37/049 99/427 |
| 4,625,634 A * | 12/1986 | Kruper | ................. | A47J 37/049 99/402 |
| 4,882,985 A * | 11/1989 | Beller | ................. | A47J 37/0745 126/25 R |
| 5,032,183 A * | 7/1991 | Frazier | ................. | A47J 37/0694 126/39 R |
| 5,325,767 A * | 7/1994 | Beller | ................. | A47J 43/18 99/421 R |
| 6,038,965 A * | 3/2000 | Thorndyke | ......... | A47J 37/0682 126/25 R |
| 6,327,967 B1 | 12/2001 | Pei | | |
| 6,418,835 B1 * | 7/2002 | Lin | ................. | A47J 37/042 219/400 |
| 6,425,318 B1 * | 7/2002 | Kim | ................. | A47J 37/0709 99/327 |
| 7,395,602 B2 | 7/2008 | Backus | | |
| 7,617,767 B2 | 11/2009 | Osterman | | |
| D639,601 S | 6/2011 | Borovicka | | |
| D640,501 S | 6/2011 | Zemel | | |
| 8,919,334 B2 * | 12/2014 | Glanville | ............ | A47J 37/0704 126/1 R |

(Continued)

*Primary Examiner* — Reginald L Alexander
(74) *Attorney, Agent, or Firm* — Jyoti C. Iyer (57) ABSTRACT

Disclosure of a flipping device for cooking foods in an oven at home or at a commercial location resulting in a uniform cooking of the food as well as retaining a juicy texture uniformly within the food.

18 Claims, 4 Drawing Sheets

(56) References Cited

U.S. PATENT DOCUMENTS

| | | | |
|---|---|---|---|
| 2003/0005827 A1* | 1/2003 | Kahler | A47J 37/0694 99/394 |
| 2004/0144260 A1* | 7/2004 | Backus | A47J 37/041 99/419 |
| 2007/0101869 A1* | 5/2007 | Gelfand | A47J 37/041 99/419 |
| 2011/0283893 A1* | 11/2011 | Bennett | A47J 37/044 99/421 H |
| 2012/0024169 A1* | 2/2012 | Hsu | A47J 37/042 99/450 |
| 2012/0037012 A1* | 2/2012 | Stier | A47J 37/041 99/421 H |

* cited by examiner

APPARATUS AND METHOD FOR FLIPPING FOOD

This application claims the benefit of U.S. Provisional Application Ser. No. 61/699,988 filed Sep. 12, 2012, which is incorporated in its entirety by reference.

FIELD

This disclosure relates to apparatus and methods to roast foods including turkey and other meats and birds in a home or in personal use ovens.

This disclosure provides an inventive apparatus and a method to roast turkey and other birds and meats at home delivering high quality juicy roasted meals. The apparatus includes a meat/meal holding base which has the capability to hold any drippings or juices from the roasting meats, and a rack that holds the cooking meat which is designed to flip the cooking bird or meat at any point during the cooking process. This ability to flip or turn the bird or cooking meat in progress of baking allows a uniform cooking and roasted crust formation on the meat such that the finished meal is uniformly and evenly roasted at the completion of the meal.

BACKGROUND

Meats at home are usually roasted in conventional ovens for the required cooking of the proteins in meat, and to provide the best flavor development within the cooked meat. The flavors and textures that result during the roasting process provide a very palatable and desirable experience to the consumer. The roasting of meats can be controlled when performed on a small meal portion or when the cooking food is a thin slab such that the meat cooks fairly well and uniformly without overcooking some portions of the same meal.

However, when preparing large meals, such as Thanksgiving Turkey dinners and other festive holiday dinners, the large portions of meat tend not to cook uniformly in a conventional oven found in many homes. The main reason is that because of the large meat portions, by the time the coldest parts of the meat are uniformly cooked through out, the meat surfaces exposed to excessive cooking times tend to dry out and over cook in the process. These overcooked portions are usually more of a problem when the meat portions are extremely large and sometimes may even be stuffed internally with other meal portions (for example Turkey Stuffing). In order to achieve the full cook of such meals, the roasting process can be extremely long and non-uniform under conventional cooking conditions.

Some large scale commercial systems do exist to provide uniform cooking of meat portions that are very large, for example Rotisserie ovens. In these processes, the constant rotation of the meats tends to uniformly cook the meats from the surface to inside without excessive exposure of the meat pieces to the heat source. The Rotisserie units are very bulky and more suited for larger throughput rates such as in restaurants or at Food Service centers, and are not suitable for home use.

At homes, roasted meats can be rotated at scheduled intervals during the roasting process to achieve a more uniform cooking process of the meat. This manual rotation though feasible for small meals, gets to be extremely difficult for large meals. A roasting turkey bird during a Thanksgiving feast, for example, can weigh in excess of 25 pounds. These meals when manually turned over with existing kitchen utensils can be extremely difficult, dangerous (due to very hot roasting temperatures), and sometimes not achievable. Therefore, there is a need to develop a device or a process to allow for a facilitated turning over or flipping of large meat portions during a home roasting process.

Traditionally, meats when roasted in an oven are placed in a roasting pan and roasted in an oven for a time and temperature related to the size of the cooking meal and the required finished product format. Some meals are baked in an oven at a low temperature for extended periods to provide a slow roasting and gentle flavor development in the meats. Other meats are prepared by cooking the meals at high temperatures for a short time such that the meats form a well cooked exterior and a juicy semi-cooked interior.

Sometimes, these meals are coated or rubbed with oils, spices, or herbs to provide an infused flavor and aroma within the cooked meat at the completion of the roasting process.

In traditional home roasting of meats in an oven, the meats are placed in the baking tray traditionally fitted with a baking rack. The cooking meat is placed in the rack such that as the roasting progresses, any juices, fats or liquids can drip out of the meat onto the baking tray leaving the meat partially dry such that a roasted dried skin forms to encompass the cooked meat. However, the roasted surface is sometimes partially scorched or even dried beyond the desired textures such that the overall meat attains a dried tough state. During certain holiday seasons such as Thanksgiving, and other holidays, large birds and fowl meats such as turkeys are roasted in traditional home ovens and these meats tend to get partly scorched, dried, or unevenly cooked in the oven due to the poor cooking processes in the ovens. This uneven cooking of meats is further aggravated in a conventional home use oven because these meats are placed in the ovens and cannot be turned over or rotated during the traditional process because the cooking meats are extremely hot and break apart when maneuvered with cooking utensils available in a traditional home. The meats surfaces exposed to the heated side (i.e. the side facing upwards and away from the baking pan) undergo extensive drying and excessive heat treatment such that the meats adjacent to the heated surface get extremely tough, dried and unpalatable. The meat surfaces facing the baking tray tend to stay moist and partly undercooked during the conventional cooking process since the meats in this portion are not exposed to the roasting temperatures as much and also constantly exposed to the dripping juices and fats. At the end of the cooking process, the cooked meats therefore are not uniformly cooked, and the top half of the cooked meats and birds are partly over-dried, tough, and overcooked, whereas the meats at the bottom half are soft textured, less cooked and moist.

Therefore, there is a need to be able to provide the methods and processes to enable a more controlled roasting technique for home-roasting of meats. Other documents that discuss the processes and apparatus to roast meats fail to incorporate the ability to rotate the meats during the cooking process (U.S. Pat. Nos. 6,327,967, D639,601). U.S. Pat. No. 7,617,767 (Osteran et al) describes a device to hold and rotate turkey in ovens using a rod to hold the cooking meat supported solely onto end walls of the device. This method however relies on a skilled user to be able to carefully be able secure the rod into the uncooked bird, rotate the roasting meat without mishandling or falling off of roasting meat and any stuffing within roasting meat. Backus et al. (U.S. Pat. No. 7,395,602) describes a device to lift, move and flip foods relying on piercing hooked devices into the uncooked meat which is not suited for roasting ovens or for use at residential scale.

Other documents (Pei: U.S. Pat. No. 6,327,967 and Zemel (U.S. Pat. No. D640,501) disclose apparatus that can enable holding devices to contain roasting meats but fail to consider the ability to rotate the meat at intermittent stages—a key enabler to deliver the desired final roasted product. Some patents relate to the rotisserie processes which successfully roast fowl meats in commercial ovens, however, these processes cannot be converted or scaled down for implementation in a home-use oven.

SUMMARY

The disclosure provides a cooking apparatus for uniform cooking of one or more food items. The cooking apparatus includes a flipping device positioned within a holding pan. The holding pan includes a handle. The flipping device includes a flipping device top, a flipping device bottom and an adjustable clamp. An enclosure within the flipping device is defined by a space between the flipping device top and the flipping device bottom. The adjustable clamps adjust the size of the enclosure to the size of the food. The flipping device bottom includes a handle for manual rotation of the flipping device. The flipping device bottom further includes a temperature probe. The flipping device bottom further includes a thermometer. The one or more food item is positioned within the enclosure in the flipping device. The handle for manual rotation of the flipping device is used to manually turn over the flipping device so that a central axis of one or more food items parallel to the bottom surface of the enclosure are rotated by a 180° angle or at an angle less than 180°.

The disclosure provides a flipping device removable from the holding pan.

The disclosure provides a flipping device for insertion into a cooking apparatus. The flipping device includes an enclosure. The enclosure holds the large portioned food item for cooking. The flipping device can be manually turned during cooking.

In some embodiments the handle for manual rotation of the flipping device is detachable from the flipping device bottom.

In some embodiments, the handle for manual rotation of the flipping device is not detachable from the flipping device bottom.

The disclosure provides a flipping device with an adjustable clamp. The adjustable clamp is manually tightened to adjust to shrinkage of the one or more food items during cooking.

The disclosure provides a flipping device having a food contact-safe metallic material. The disclosure provides a flipping device having a food contact-safe material.

In some embodiments, the disclosure provides a flipping device having a coating with a non-stick material.

In some embodiments, the flipping device is made from a non-stick material.

The disclosure provides a flipping device with perforated walls. In some embodiments, the flipping device top has perforated walls. In some embodiments the flipping device bottom has perforated walls.

In some embodiments, the holding pan is a non-stick material.

In some embodiments, the holding pan includes a basting device.

In some embodiments, the holding pan includes an aluminum baking pan.

In some embodiments, one side of the holding pan has a lower profile than the other side.

In some embodiments, the one or more food items being cooked is a large portioned food item of at least 1.5 kilograms.

In some embodiments, the large portioned food item is turkey, turkey stuffed with stuffing, chicken, Cornish hen, ham, formed meat, bovine meat, porcine meat, meat from other animal sources, seafood, and meat with stuffing. The stuffing includes but not limited to combinations of chopped and seasoned ingredient such as bread cubes, meats, eggs, vegetables, herbs, seafood, nuts, fruits, and spices used to stuff meat and vegetables.

BRIEF DESCRIPTION OF THE DRAWINGS

The objectives and advantages of the disclosed teachings will become more apparent by describing in detail preferred embodiments thereof with reference to the attached drawings in which:

FIG. 1.1 provides three components—Component A, Component B and Component C. FIG. 1.2 provides a reference schematic to indicate the three dimensional orientation of the components.

DETAILED DESCRIPTION

The disclosure provides a cooking apparatus for uniform cooking of one or more food items. The cooking apparatus includes a flipping device positioned within a holding pan and an enclosure. The holding pan includes a handle. The flipping device includes a flipping device top, a flipping device bottom and an adjustable clamp. The flipping device bottom includes a handle for manual rotation of the flipping device. The flipping device bottom further includes a temperature probe. The flipping device bottom further includes a thermometer. The one or more food items is or are positioned within the enclosure. The handle for manual rotation of the flipping device is used to manually turn over the flipping device so that a central axis of the one or more food items parallel to the bottom surface of the enclosure is/are rotated by a 180° angle or at an angle less than 180°.

In the art of baking meats in an oven several terms are generally used. These terms relate to a heating process to convert the raw meats to a cooked state with the desired level of flavor, aroma and texture development at the completion of the cooking process. Some terms used for cooking food in an oven include but are not limited to roasting, baking, broiling, grilling, slow-roasting, simmering, frying, pressure cooking, pressure frying, sizzling, searing, basting, and cooking. In this document, the term roasting describes the process of cooking, but in essence roasting includes any form of controlled heat treatment in an oven.

The disclosed teachings provide a meat/bird flipping device (referred to as the flipping device) that fits into a baking dish for use in a home-use oven. The flipping device is equipped with two handles at 2 sides such that the cooking meat can be flipped over top side to bottom during any time of the roasting process such that the cooking meats can be cooked evenly during the cooking process. The flipping device is designed such that the user has minimal difficulty in turning over the cooking meats during the roasting process, and also incurs minimal to no breakdown of the cooking meats during the flipping process.

The disclosure provides an apparatus system that can allow the flipping of the meats during a roasting process in a home-use conventional oven such that the cooked meats are uniformly cooked and provide a good quality soft-textured, moist meat at the end of the cooking process.

The disclosure also provides methods to roast meats for home-use ovens with the use of the flipping device.

A flipping device to manually turn over, flip or partly rotate a cooking meat at different stages of cooking in a conventional oven used in personal homes. This design can be used in any of the home use ovens of both the appliances relying on electrical as well as natural gas for heating.

The flipping device is designed such that a range of cooking meats for home use can be processed. The unit is capable of roasting bird meats such as turkeys, chicken, Cornish hens. These meats can be stuffed in advance of the baking step with a variety of stuffing and the meats can also be pretreated with a variety of rubs, oils, salts, juices, fats, fluids, herbs, vegetable extracts, meat based ingredients to further enhance the flavor, texture or aroma of the cooked meat. The stuffing includes but not limited to combinations of chopped and seasoned ingredient such as bread cubes, meats, eggs, vegetables, herbs, seafood, nuts, fruits, and spices used to stuff meat and vegetables. In addition to roasting bird meats, the device can also roast a variety of meats such as hams, formed meats, meats from bovine, porcine, seafood, or other animal sources for human consumption.

The flipping device is also capable of holding a variety of vegetables or tuber roots such that an even roasting/cooking can be achieved to the foods during the home-use conventional ovens.

The flipping device is manufactured by a material that can withstand oven roasting temperatures. The material must also be approved for contact with food systems during oven roasting process such that the material does not release any agents or components into the food product and therefore render the cooked food unsafe to eat or not palatable. The preferred materials for the fabrication of the flipping device are but not limited to aluminum, stainless steel, brass, copper, and, combinations of these materials, and these materials can further be coated with coating such that the device has additional functionalities. These functionalities include but are not limited to "non-sticking", good heat transfer, visual appeal, easy for cleaning, tarnish-resistance, and easy for handling by the user for the flipping functionality such as good gripping capabilities.

The flipping device (FD) is also designed to provide some level of adjustability to the size of the cooking meats. This is necessary to ensure that the cooking meat is not disturbed or minimally disturbed during the flipping step such the meat does not disintegrate or break apart. If the holding cage of the flipping device is too large for the cooking meat or food, the food can tend to shift or dislodge during the flipping device and undergo some deformation or breakdown. To address the adjustable size feature of the flipping device, the unit is equipped with filler units of a range of volumes which can be filled into the cage portion of the device such that the cooking meats do not get dislodged.

Figure 11:
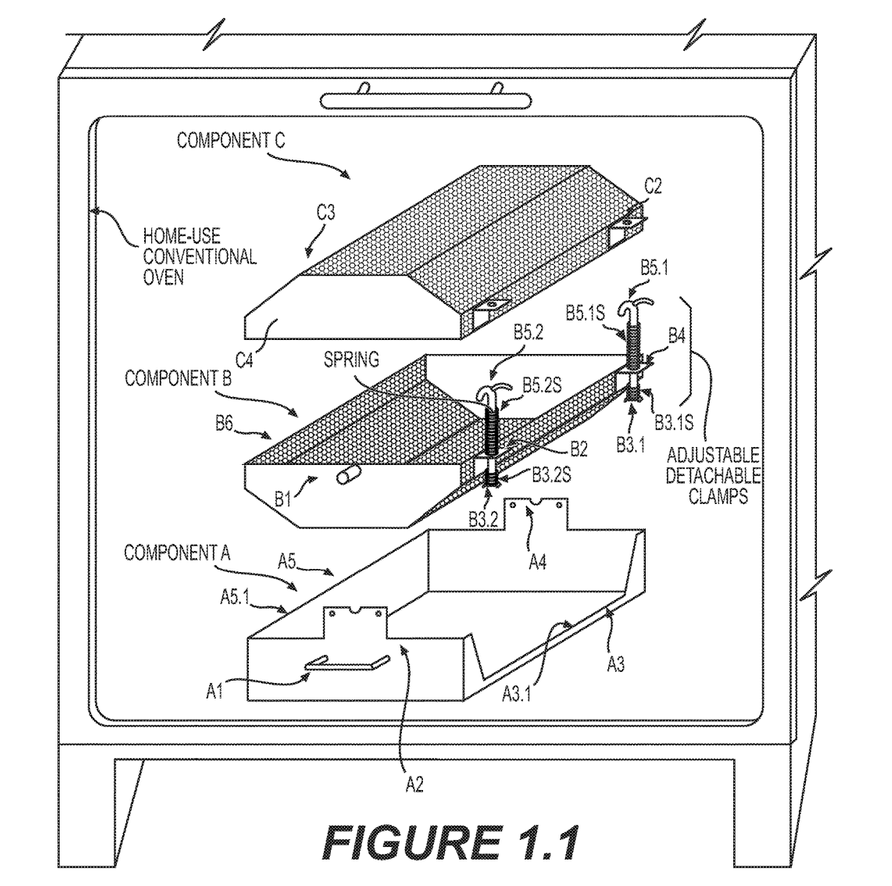

The disclosure provides a Flipping device for foods (such as but not limited to large Poultry or animal meats) baked in a conventional oven with surprisingly facilitated turning over or flipping process during different stages of baking. FIG. 1.1 details a schematic of the flipping device comprising of two main components: Flipping device top (Component C) and a flipping device bottom (Component B). Components A and B hold the cooking food securely in the oven during the process, while allowing for any juices or fats to drip freely away from the meats and provide the required cook and texture in the cooked meat. As the food is baking in the oven the apparatus described in this invention enables facilitated flipping of the food in the oven and therefore provides a uniform cook and textured finished food product.

In some embodiments, the flipping device has the ability to hold a cooking meat of about 4 to 40 Pounds weight. Some examples of foods include but not limited to poultry meats, roasting meats, Lamb, Steaks, Fish, Vegetables, Stuffing, Breads, Pork, Veal, and Game meats. The stuffing includes but not limited to combinations of chopped and seasoned ingredient such as bread cubes, meats, eggs, vegetables, herbs, seafood, nuts, fruits, and spices used to stuff meat and vegetables. The flipping device is also designed to contain a caged exterior such that any drippings, fats, liquids can readily flow out of the cooking meat to the containing baking tray.

Figure 12:
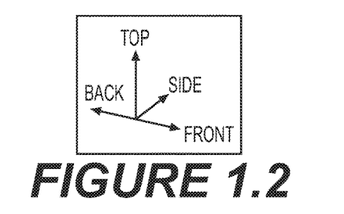

FIG. 1.1 also shows the Holding Pan (indicated as Component A or referred to in this document as HP). The HP holds the actual flipping device of the food undergoing the baking process (indicated as Components B and C) for cooking meat or poultry foods. The drawing further separates a Flipping Device (also referred as FD) into Flipping Device Top (Component C, also referred as FDT) and a Flipping Device Bottom (Component B, also referred to as FDB). Both FDT and FDB include a halved hexagonal-shaped metallic mesh casing made of for food-contact and oven use materials. The longer dimensioned sides of FDT and FDB are defined as anterior and posterior sided of the device whereas the short sides are devised as the adjacent faces of the device as indicated in the reference axis as indicated in FIG. 1.2.

In FIG. 1.1, the posterior and anterior sides of FDT and FDB units are equipped with detachable clamps (B3.1, B3.2, B5.1 and B5.2) with handles to enable opening and closing of the device. The detachable clamps are referenced. to as B3.1, B3.2, B5.1 and B5.2. The device comprises of 2 clamping systems on the anterior side and 2 clamping systems on the posterior side (not indicated in the FIG.1.1, but marked in locations B6 and C3). Further, the adjacent faces of FDB are equipped with two shafts (indicated as B1 in FIG. 1.1) that extend away from the enclosure. The shafts are used to affix the device onto a Holding Pan (HP) designed to contain any drippings or food fragments that may fall off during the roasting process. The HP unit (component A in FIG. 1.1) is a solid-walled metallic pan. HP is rectangular shaped from top view; longer sides defined as posterior and anterior sides whereas the short sides defined as adjacent sides). HP is further designed with raised lips (referenced in FIG. 1.1 as A2, A3, A3.1 and A5, A5.1) from the base to enable holding of any liquid, drippings during the roasting process. The raised lip is lowered at anterior side (as shown in FIG. 1.1 at A3.1) and raised at the posterior side (as shown in FIG. 1,1 at A5,1) to enable facilitated placement of FD onto HP. At adjacent sides of HP, a raised lip (indicated in FIG. 1.1 at A4) is provided, with a depression in lip that is capable of holding the shafts from FDB and capable of suspending the FD unit within the HP during the roasting process. Both the FDB's shafts as well as the depressions of HP are designed with a circular cross section so that the FD unit can be easily rotated within the HP during the roasted process.

As seen in Figure 1.1, the flipping device consists of Holding Pan (HP), Flipping Device Bottom (FDB), and Flipping Device Top (FDT). In some embodiments, the device consists of 4spring loaded clamps (B3, 1S, B3, 2S, B5, 1S, B.2S) at base to securely affix FDB to FDT. The spring loaded clamps enable the ability of FD unit to hold cooking meats of different sizes, or foods that may undergo shrinking during the cooking process.

Some embodiments also include a Holding pan (Component A) under the flipping device to collect any drippings from the cooking meat. Flipping component B (FDB) in FIG. 1.1 is equipped with handles (A1) to enable safe and secure removal of the flipping device from the oven and returning the unit back to the oven after the flipping step. The Flipping device components B and. C are also equipped with a fastening device (B2, B4 and C2 respectively) loaded with a spring system (B3, 1S, B3, 2S,B5.1S and B5.2S) to hold the cooking meats securely. This is particularly important in baking of foods which undergo shrinkage, expansion or shifting during baking processes. If the food flipping device is not equipped with this spring adjustment system, the foods undergoing baking will tend to fall out or become distorted and thereby ruining the appearance and format of the finished baked food, The walls of the flipping device are also perforated to enable the escape of food juices and steam from the food during the cooking process. In FIG. 1.1, the perforations are indicated on the flipping device top (C3) and bottom (B6). The sides of the flipping device (as indicated by C4) are constructed of solid metal to provide strength and integrity during the cooking process.

The holding pan (Component A), also indicated in FIG. 1.1, is provided with a location to house a disposable or non-disposable aluminum tray under the cooking food, such that any dripping from the cooking food can be collected within the holding pan and therefore minimize clean-up of the apparatus after completion of cooking, The entire holding pan unit is designed such that the aluminum tray can be conveniently and securely placed in the holding tray and transported to and from the oven, The holding pan is specifically designed to contain 2 handles to facilitate the transportation of the flipping device (as indicated by A1 in front side). The side walls oldie holding pan are fabricated from solid metal sheet to provide support and integrity to the holding device as label in the FIG. 1.1 as A2. Similarly, the back side of the holding device is also constructed out of solid metal sheet and raised in height (shown as A5.1 in FIG. 1.1) to help contain any splashing of dripped fluids during cooking as indicated by A5. Also, the side walls of the holding device. However, the front side of the holding device is designed with a lower raised edge such that the flipping device can be easily slid into and out of the holding device during the baking process (as indicated in the FIG. 1.1 as A3.1).

In FIG. 1.1, the spring loaded clamping system enables a secure hold of the baking food within the FDT and FDB units. Hooks can connect the FDT and FDB units. The clamping system contains screw based clamp with two hooking fixtures that can be affixed to the FDT unit at the hooks. The screw system of the clamp device is extended through the hook located at FDB unit. After passing through the FDB unit, a spring unit is affixed to the clamping system. This spring system below FDB attachment position ensures that the FDB and FDT units are securely fastened and as the cooking meats undergo any shrinkage or expansion, the spring system can readily act to guarantee a secure fitting. The spring system is further securely connected to the clamping system by the attachment of the butterfly nut device at the base of the clamp system.

The Hold down clamping enables a secure fit of the FD components such that the contained cooking food is held with minimized dislocation or distortion during the baking process. Since most baking foods tend to structurally distort or degrade during the baking process, this spring based clamping system ensures structural integrity of the finished baking product.

Figure 2:
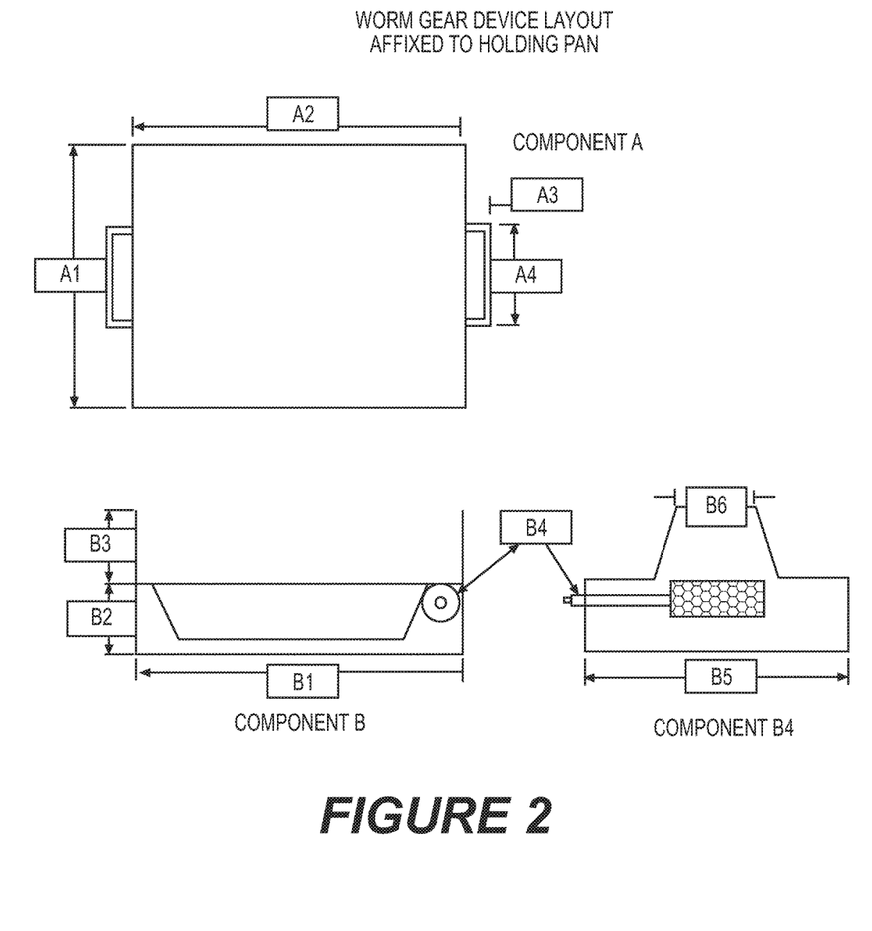
FIG. 2 describes an embodiment of the invention, which replaces one of the shafts (B1) from the FDB units with a Worm Drive Device (referred to in text as WD and indicated in FIG. 2 at B4).

One embodiment includes a Worm-driven Device (referred to hereafter as Worm gear Device or WD and indicated in FIG. 2 as Component B in Front view and as Component B4 in side view) within the HP previously discussed in FIG. 1.1 and currently represented as Component A in FIG. 2 to facilitate rotation of the cooking food as detailed in FIG. 2. FIG. 2 provides a Worm gear device layout affixed to holding pan in the side view as indicated in Component B4. The WD unit in this embodiment is schematized in frontal view as Component B and in the side view in Component B4 of the FDB, and consists of a gear system that can drive the rotation of the FD unit at predicted and controlled levels. The gear system consists of rotational components that are manually driven by a handle that can be affixed to the gear device.

FIG. 2 has three schematics to detail the incorporation of WD unit on to the HP unit. Component A in FIG. 2 represents the overview of the HP unit from a Top view as similarly represented as Component A in FIG. 1.1. A1 is the side dimension of the holding pan, A2 is the front dimension of the holding pan, A3 is the handle affixed to the holding pan unit and A4 is the length of the holding handle unit. Component B in FIG. 2 represents the Frontal view of the HP unit with the lower lip at the frontal side of HP represented at B1 of FIG. 2. B1 is the frontal view of the holding pan indicating the lowered edge to facilitate sliding of flipping device, B2 is the raised edge of the side walls of the holding pan, B3 is the location where the flipping unit is located in comparison to the holding pan unit, B4 is the worm gear device attached to the holding pan. Component B4 in FIG. 2 elaborates the WD unit as it is affixed onto the HP unit at the frontal side (Component B) from a side view. B4 is the central shaft of the worm gear, B5 is the side wall of the holding pan device, and B6 is the raised wall of the holding pan side where the filling device is affixed.

The WD fastens onto the F) components, and helps in easy rotation of the cooking food. The WD system is designed to be supported within the HP at specially equipped grooves as indicated in FIG. 1.1 at A4 and also indicated in FIG. 2 at location B6. The worm device consists of a worm gear device that can be rotated easily with a detachable handle. Ability to detach this handle enables a compact foot print and easy access for the unit during baking process, cleaning, or storage. In one embodiment, the meat that is cooked in the device is juicy, moist and soft textured in all sides of the meat.

Figure 3:
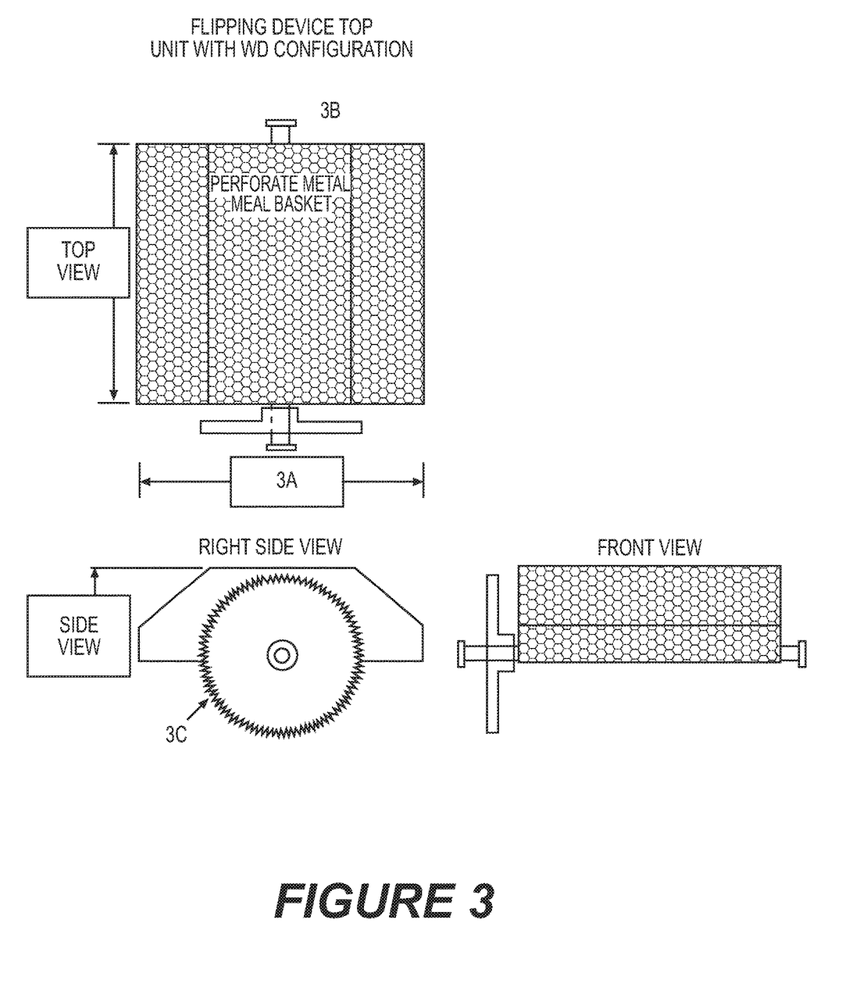
FIG. 3 provides the assembly of the WD unit onto the FED unit using a detachable Rotating Handle (RH) unit.

FIG. 3 illustrates the FDT unit with a preferred embodiment of rotational capability of the unit with the attachment of the WD system. In this embodiment, one of the shafts described in FIG. 1.1 is replaced with a Worm-Gear Drive (WD) which is suited to precise rotation of the FD unit, and not allowing any free movement of the FD unit over the HP unit. The WD unit is further affixed with a detachable Rotation Handle (RH) which can be fixed to the WD only during the times when the FD unit needs to be rotated to fixed positions. The WD unit is designed to contain a gear system that is affixed to the HP unit so that FD can be rotated only when the RH unit is turned at the FDB unit.

In this embodiment, the flipping device is enabled with rotational feature during the baking process as facilitated by the worm device unit. In FIG. 3, 3A represents the FDT unit side, whereas 3B indicates the shafts extending from the FDT unit that affix to the Holding pan unit side walls securely during the cooking process. At the opposite side of the FDT unit (as indicated as location 3A), a gear device is affixed to the FDT unit that is attachable to the worm device located on the FDB unit as shown in FIG. 2 at location B4. The gear device is designed such that when the FDT unit is attached to the FDB unit, the gear device engages with full alignment to the WD device of the FDB unit and allows for the rotation of the FD unit when the WD unit is rotated with a crank shaft (to be described in FIG. 4).

Figure 4:
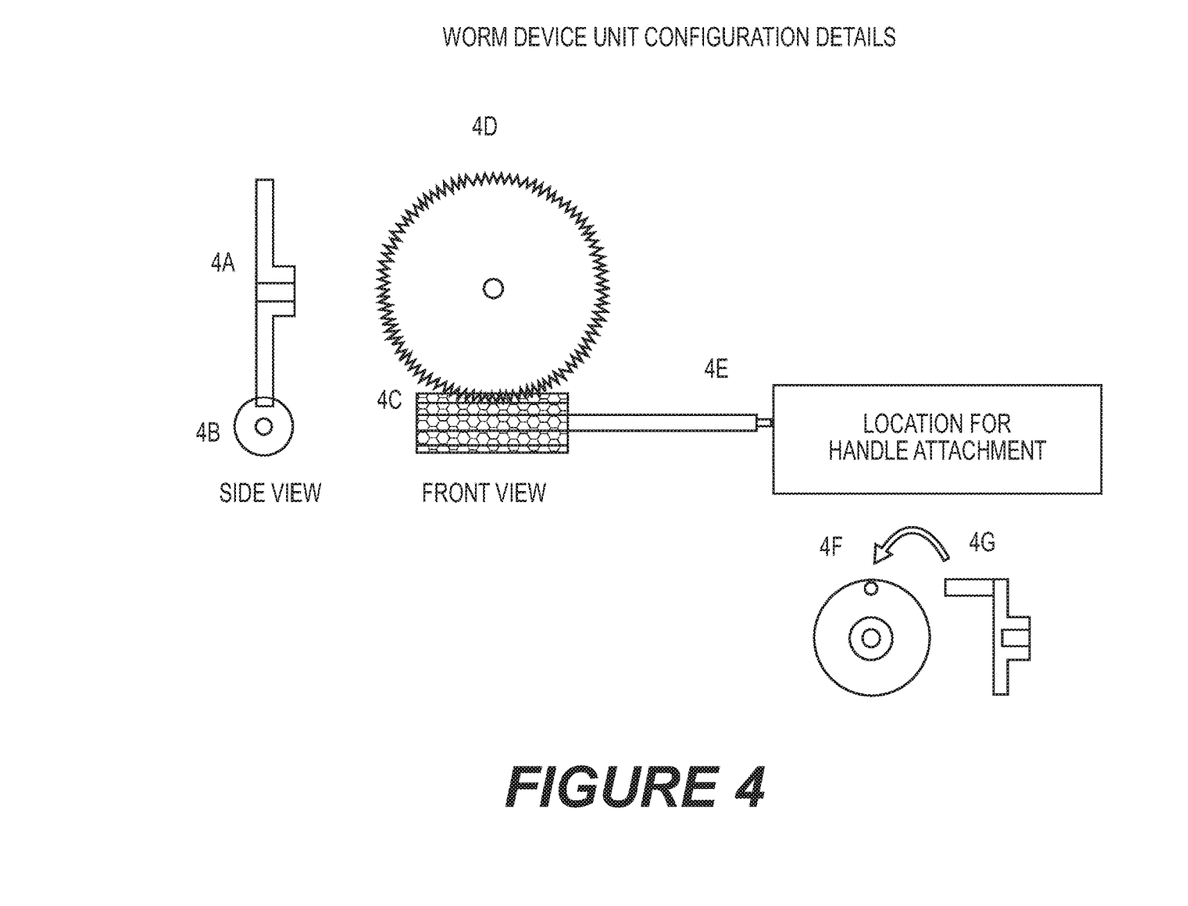
FIG. 4 provides a method to affix the worm gear (represented as 4A in side view and 3A in frontal view) to the worm drive (indicated at 4B in side view and 4C in frontal view) of the holding pan.

FIG. 4 provides a method to affix the worm gear (represented as 4A in side view and 3A in frontal view) to the worm drive (indicated at 4B in side view and 4C in frontal view) of the holding pan. FIG. 4 illustrates the alignment of the WD unit when the Gear device from FDT unit is engaged with the WD unit from the FDB unit. FIG. 4 illustrates the side view of the Gear Device from FDT unit when engaged with the Worm-driven device located on the FDB unit. The Side view as indicated in FIG. 4 shows the gear device from FDT unit at location 4A and the WD unit from the FDB unit at location 4B. The image is also represented in FIG. 4 from a Front view with the Gear unit of FDT unit located at 4D and the WD unit from FDB unit located at 4C. The WD unit also consists of an extended shaft away from the location of engagement with the Gear device as indicated at Location 4E of FIG. 4. To enable a facilitated rotation of the FD unit using the WD device, a Crank unit is attached to the extended shaft of the WD unit, as illustrated as component 4G. The Crank unit can be attached to the extended unit of the WD at location 4F as also shown in FIG. 4. By this use of the Crank shaft, the FD unit can be more easily rotated using the WD unit to different rotation angles of the cooking foods.

The disclosure provides a cooking apparatus for uniform cooking of one or more food items. The cooking apparatus includes a flipping device positioned within a holding pan. The holding pan includes a handle. The flipping device includes a flipping device top, a flipping device bottom and an adjustable clamp. An enclosure within the flipping device is defined by a space between the flipping device top and the flipping device bottom. The adjustable clamps adjust the size of the enclosure to the size of the food. The flipping device bottom includes a handle for manual rotation of the flipping device. The flipping device bottom further includes a temperature probe. The flipping device bottom further includes a thermometer. The one or more food items is or are positioned within the enclosure in the flipping device. The handle for manual rotation of the flipping device is used to manually turn over the flipping device so that a central axis of the one or more food items parallel to the bottom surface of the enclosure is rotated by a 180° angle or at an angle less than 180°.

Some embodiments provide an apparatus that allows for a uniform cooking of foods in a commercial or residential oven. In some embodiments, the apparatus contains specific features to enable the turning of the baking food such that both sides of the food get uniformly baked. In some embodiments, the flipping device consists of a metallic enclosure of the baking food that is contained within a tray to collect any drippings or fallen food objects. In some embodiments, the flipping device is removable and can be turned around during intermediate stages of the baking process such that the baked food at end is uniformly cooked.

In some embodiments a large portioned food item (greater than 1.5 Kilograms) is flipped with a flipping device to turn over the food item being cooked, by rotation of the food's center axis parallel to the bottom surface by 180°. In some embodiments, the flipping device is removable from the holding pan. Some embodiments provide a flipping device for insertion into a cooking apparatus. The flipping device includes an enclosure. The enclosure holds the large portioned food item for cooking. The flipping device can be manually turned during cooking.

In some embodiments the handle for manual rotation of the flipping device is detachable from the flipping device bottom. In some embodiments, the handle for manual rotation of the flipping device is not detachable from the flipping device bottom.

In some embodiments, the baking flipping device consists of adjustable clamps so as to securely hold different sized foods during baking process. The adjustable clamp is manually tightened to adjust to shrinkage of the one or more food items during cooking. In some embodiments, the flipping device is coated with a non-stick material such that the baked food does not stick to the flipping device. The disclosure provides a flipping device having a food contact-safe metallic material. In some embodiments, the disclosure provides a flipping device having a coating with a non-stick material. In some embodiments, the flipping device is made from a non-stick material. The disclosure provides a flipping device with perforated walls. In some embodiments, the flipping device top has perforated walls. In some embodiments the flipping device bottom has perforated walls. In some embodiments, the holding pan is a non-stick material. In some embodiments, the holding pan includes a basting device. In some embodiments, the holding pan includes an aluminum baking pan. In some embodiments, one side of the holding pan has a lower profile than the other side. In some embodiments, the one or more food items being cooked is a large portioned food item of at least 1.5 kilograms. In some embodiments, the large portioned food item is turkey, turkey stuffed with stuffing, chicken, Cornish hen, ham, formed meat, bovine meat, porcine meat, seafood, meat from other animal sources, and meat with stuffing. The stuffing includes vegetables, tuber roots and combinations thereof. Stuffing can include a mixture of chopped and seasoned ingredients, bread cubes, meats, eggs, vegetables, herbs, nuts, fruits, meats, and spices used to stuff meat and vegetables In some embodiments, the flipping device is made of temperature sensitive components so as to enable optimal usage in ovens during baking process. In some embodiments, the flipping device is designed to contain a temperature measuring device so as to monitor the temperature of the baking food. In some embodiments, the flipping device can be rotated within the holding pan at incremental angles so as to uniformly expose the cooking food to the heated air.

In some embodiments, the holding pan is made of non-stick material. In some embodiments, the holding pan is designed to hold the dripping juices from the baking food. In some embodiments, the holding pan is incorporated with a basting device. In some embodiments, the holding pan is designed to include handles to help facilitate the placement of the holding pan and food in flipping device and the removal of the same units relatively easily from the oven.

Some embodiments provide food products made with the apparatus.

It will be readily understood by the skilled artisan that numerous alterations may be made to the examples and instructions given herein. These and other objects and features of present invention will be made apparent from the following examples. The following examples as described are not intended to be construed as limiting the scope of the present invention.

EXAMPLES

Example 1

Flipping Device 1: FIG. 1.1 provides a flipping device designed to hold bird meats or other cooking meats in the weight range of about 4 to about 40 pounds. The device is for use in large meal preparations at home such as turkey at Thanksgiving meals or other occasions. The device is also suited to use for regular meal portion needs.

Example 2

Flipping Device 2: In FIG. 2, the flipping device contains a rotation device to rotate the cooking meat. The chamber is rotated by the use of the worm drive system to drive the rotation of cooking chamber to controlled and locked positions within the HP unit. As the worm drive system is rotated while the meat is still cooking in the chamber, the cooking meat can be rotated to allow for uniform cooking and browning of the meat.

Flipping Device 3: In FIG. 1.1 or FIG. 2, the flipping device allows for an adjustable volume within the cooking chamber to account for initial size variation of the food to be cooked, or for the shrinkage of the cooked food due to dripping of food liquids (moisture, fats, salts, broken or burnt food pieces). The volume in the cooking chamber is adjusted by the use of hold down clamping system. The hold down clamping system enables a spring type clamping system that restricts the movement of the cooking chamber during the rotation step. However, the hold down clamping system allows the cooking chamber to tighten as meal undergoes cooking.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A cooking apparatus for uniform cooking of one or more food items in a home-use or personal use oven, the cooking apparatus comprising:
    a flipping device and a holding pan within a home-use or personal use oven, wherein the flipping device is positioned within the holding pan,
    the flipping device comprising a flipping device top, a flipping device bottom and an adjustable clamp, wherein the adjustable clamp securely affixes the flipping device top to the flipping device bottom,
    an enclosure within the flipping device being defined by a space between the flipping device top and the flipping device bottom,
    the flipping device bottom comprising a handle for manual rotation of the flipping device, a temperature probe and a thermometer, wherein one or more food items is, positioned within the enclosure, and
    the holding pan comprising a handle, an anterior side wall comprising an edge (raised lip) on the anterior side wall, and, a posterior side wall comprising an edge (raised lip) on the posterior side wall, wherein the edge (raised lip) on the anterior side wall is at a lower height compared the edge (raised lip) on the posterior side wall, whereby the flipping device can be slid into the holding pan, whereby the holding pan holds dripping juices from the one or more food items enclosed within the flipping device top and flipping device bottom,
    wherein the handle for manual rotation of the flipping device is used to manually turn over the flipping device, wherein the flipping device too comprises a perforated wall, wherein the flipping device bottom comprises a perforated wall, wherein the temperature probe and the thermometer monitor temperature of the one or more food items during cooking for uniformity of cooking, whereby a central axis of the one or more food items parallel to bottom surface of the enclosure is rotated by a 180° angle or at an angle less than 180°.

2. The cooking apparatus of claim 1, wherein the flipping device is removable from the holding pan.

3. The cooking apparatus of claim 1, wherein the handle for manual rotation of the flipping device is detachable from the flipping device bottom.

4. The cooking apparatus of claim 1, wherein the handle for manual rotation of the flipping device is not removable from the flipping device.

5. The cooking apparatus for uniform cooking of claim 1, wherein the adjustable clamp is manually tightened to adjust to shrinkage of the one or more food items during cooking.

6. The cooking apparatus of claim 1, wherein the lipping device comprises a food contact-safe metallic or any food contact material.

7. The cooking apparatus of claim 1, wherein the flipping device comprises a coating with a non-stick material.

8. The cooking apparatus of claim 1, wherein the flipping device comprises a non-stick material.

9. The cooking apparatus of claim 1, wherein the holding pan comprises a non-stick material.

10. The cooking apparatus of claim 1, wherein the holding pan comprises a basting device.

11. The cooking apparatus of claim 1, wherein the holding pan comprises an aluminum baking pan.

12. The cooking apparatus of claim 1, wherein the one or more food items is a large portioned food item of 1.5 kilograms.

13. The cooking apparatus of claim 12, wherein the large portioned food item is selected from the group consisting of turkey, turkey stuffed with stuffing, chicken, Cornish hen, ham, formed meat, bovine meat, porcine meat, meat from other animal sources, and meat with stuffing, and wherein the stuffing comprises chopped and seasoned ingredients, wherein the seasoned and chopped ingredients is selected from the group consisting of bread cubes, meats, eggs, vegetables, herbs, seafood, nuts, fruits, and spices used to stuff meat and vegetables, and combinations thereof.

14. The cooking apparatus of claim 12, wherein the large portioned food item is turkey.

15. The cooking apparatus of claim 1, wherein the one or more food items is selected from the group consisting of vegetables, tuber roots and combinations thereof.

16. The cooking apparatus of claim 1, wherein the one or more food items is se selected from the group consisting of turkey, chicken, Cornish hen, ham, formed meat, bovine meat, porcine meat and meat from other animal sources, seafood, vegetables, tuber roots and combinations thereof.

17. A food product made using the cooking apparatus of claim 1.

18. The cooking apparatus of claim 1, wherein the one or more food items is a food item ranges from 4 pounds to 40 pounds.

\* \* \* \* \*